April 1, 1969 G. L. MAZZEI ET AL 3,435,487

ATHLETIC NET STABILIZATION

Filed Dec. 6, 1966

*INVENTOR.*
GENE L. MAZZEI
WILFORD LEWIS POKRIOTS
BY

Paul B. Fihe

PATENT AGENT

United States Patent Office 3,435,487
Patented Apr. 1, 1969

3,435,487
ATHLETIC NET STABILIZATION
Gene L. Mazzei, Santa Cruz, and Wilford Lewis Pokriots, San Jose, Calif., assignors to Mike Console, San Jose, Calif.
Filed Dec. 6, 1966, Ser. No. 600,008
Int. Cl. F16g *11/03*
U.S. Cl. 24—73   2 Claims

ABSTRACT OF THE DISCLOSURE

A stabilizer for releasable attachment to each end of a net for volleyball or the like including a resilient connector arranged for attachment at one end to a rigid standard and for double attachment at its opposite end to the net suspension rope and to the net itself for tensioning the same.

---

The invention about to be described is a net stabilizer for use in various sports and games where a net is employed. Its purpose is to enable fast and accurate net suspension with maintenance of proper height at all times after being installed as directed.

The purpose of the invention and the manner in which it is achieved will become more readily understandable by reference to the following detailed description of the examplary structure illustrated in the accompanying drawing wherein.

Figure 1:
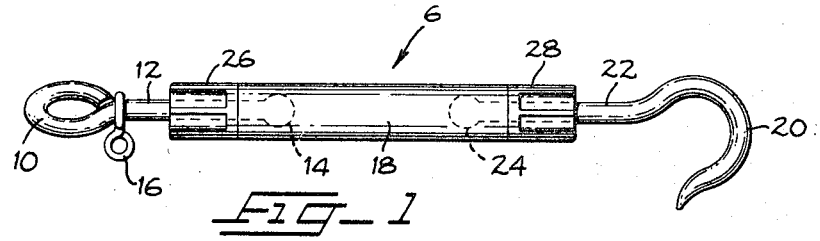
FIG. 1 is a side elevational view of a net stabilizer embodying the invention.
Figure 2:
FIG. 2 is a view of a swivel eye forming one part of the FIG. 1 unit.
Figure 3:
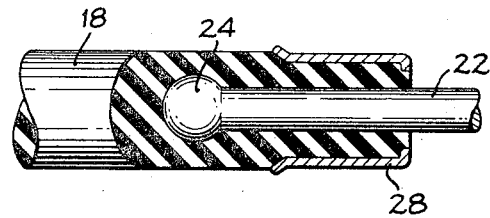
FIG. 3 is a fragmentary view, partly in section, showing interior details of the FIG. 1 structure.
Figure 4:
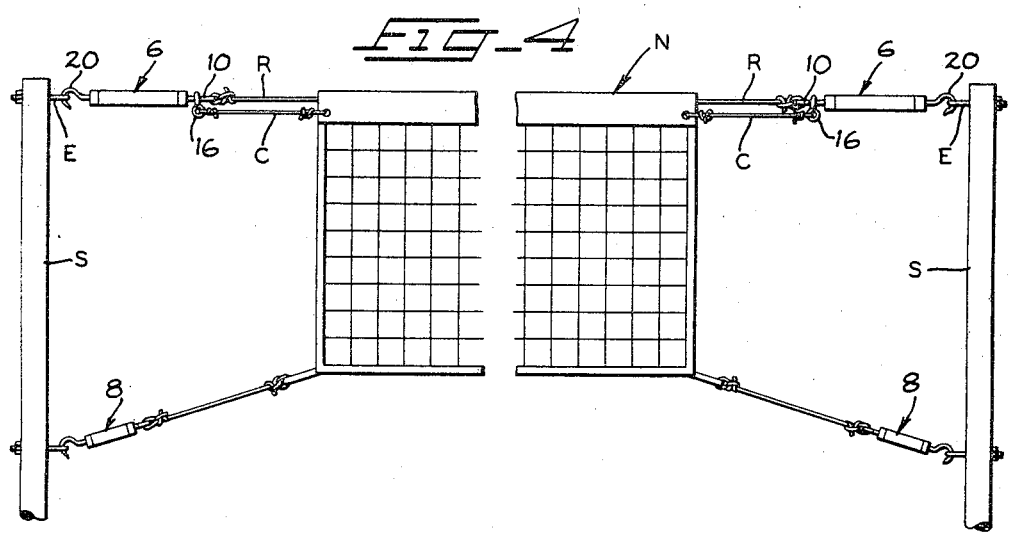
FIG. 4 is an elevational view of a net and standards illustrating use of the net stabilizer in mounting the net on such standards.

This invention has both a large size stabilizer 6 and a smaller half size stabilizer 8, sans a swivel eye, as shown in FIG. 4. The large net stabilizer is composed of the following parts: an eye 10 which has a shaft 12 about two and one-half inches long with a knob 14, that is slightly larger than the shaft, at the end; fastened to the eye 10 around the shaft 12 is a swivel eye 16, separately illustrated in FIG. 2, which hangs slightly below the shaft; a body 18 of neoprene rubber designed to give the desired elasticity and strength; a hook 20 which has a shaft 22 about two and one-half inches long with a knob 24 that is slightly larger than the shaft at the end; the above basic parts are assembled and then bonded together in a press by means of heat and pressure; the bonded rubber and metal are then anchored by means of a metal ferrule 26, 28 at each end, as best shown in FIG. 3. The small net stabilizer 8 is made in the same manner as the larger unit but the components are only half the size of the larger net stabilizer 6; the small net stabilizer does not have the swivel eye 16 attached.

The manner in which the net stabilizer is employed is illustrated in FIG. 4. Two large and two small net stabilizers are used with one net N; the large net stabilizers 6 are fastened to the top net support rope R through the large eye 10 and are adjusted to the proper net position; the hook 20 on the net stabilizer is then hooked into the proper eye E on the net standard S; the small swivel eye 16 is then attached to the net stretching string C attached to the net N at the desired tension; the two small net stabilizers 8 are then fastened to the lower corners of the net N through their eyes; the small lower stabilizers are then fastened, by means of their hooks, through the proper eyes on the standard; the proper tension is then adjusted to give the net is correct shape.

We claim:

1. A net stabilizer arranged for supporting from a standard each end of a volleyball net or the like having a support rope and a net stretching string which comprises a resilient member, means at one end thereof adapted for attachment to the standard, means at the remote end thereof adapted for connection to the net support rope, and additional means at the remote end of said resilient member adapted for separate connection to the net stretching string, said support rope connecting means including an eye having a shaft connecting the same to said resilient member.

2. A net stabilizer according to claim 1 wherein said string connecting means includes a swivel eye having one eye portion loosely encompassing said shaft and a second eye portion adapted for connection to to the stretching string.

References Cited

UNITED STATES PATENTS

| 2,991,524 | 7/1961 | Dobrikin | 24—73 |
| 2,375,357 | 5/1945 | Friedman | 24—73 |
| 318,481 | 5/1885 | Kessel | 24—73 |
| 2,708,131 | 5/1955 | Snow | 287—82 |
| 3,195,898 | 7/1965 | Respini | 273—29 |

DONALD A. GRIFFIN, *Primary Examiner.*

U.S. Cl. X.R.
273—29